(12) United States Patent
Karchov et al.

(10) Patent No.: US 10,621,016 B2
(45) Date of Patent: Apr. 14, 2020

(54) SYSTEM AND METHOD FOR MANAGING NOTIFICATIONS, NOTIFICATION SUBSCRIPTIONS AND SUBSCRIBER RESPONSES WHILE MAINTAINING SUBSCRIBER AND SUBSCRIBER DATA PRIVACY

(71) Applicants: Michael Karchov, Farmington, CT (US); Jeffrey R. Miller, Natick, MA (US)

(72) Inventors: Michael Karchov, Farmington, CT (US); Jeffrey R. Miller, Natick, MA (US)

(73) Assignee: Entrespace, LLC, Farmington, CT (US)

( * ) Notice: Subject to any disclaimer, the term of this patent is extended or adjusted under 35 U.S.C. 154(b) by 0 days.

(21) Appl. No.: 16/356,438

(22) Filed: Mar. 18, 2019

(65) Prior Publication Data

US 2019/0286501 A1    Sep. 19, 2019

Related U.S. Application Data

(60) Provisional application No. 62/643,997, filed on Mar. 16, 2018.

(51) Int. Cl.
| | | |
|---|---|---|
| G06F 9/54 | (2006.01) | |
| G06Q 10/10 | (2012.01) | |
| G06F 3/0482 | (2013.01) | |
| H04L 12/24 | (2006.01) | |
| G06F 21/62 | (2013.01) | |

(52) U.S. Cl.
CPC ............ G06F 9/542 (2013.01); G06F 3/0482 (2013.01); G06F 21/6245 (2013.01); G06Q 10/107 (2013.01); H04L 41/026 (2013.01); H04L 41/5051 (2013.01)

(58) Field of Classification Search
None
See application file for complete search history.

(56) References Cited

U.S. PATENT DOCUMENTS

| | | | |
|---|---|---|---|
| 6,430,561 B1 * | 8/2002 | Austel | ................. G06F 21/6218 |
| 2006/0047605 A1 * | 3/2006 | Ahmad | ................ G06F 21/6245 |
| | | | 705/64 |

* cited by examiner

*Primary Examiner* — Craig C Dorais

(57) ABSTRACT

A system and method for managing notifications, notification subscriptions and subscriber responses while maintaining subscriber data privacy is provided.

9 Claims, 3 Drawing Sheets

SYSTEM AND METHOD FOR MANAGING NOTIFICATIONS, NOTIFICATION SUBSCRIPTIONS AND SUBSCRIBER RESPONSES WHILE MAINTAINING SUBSCRIBER AND SUBSCRIBER DATA PRIVACY

CROSS-REFERENCE TO RELATED APPLICATION

This application claims the benefit of priority of U.S. provisional application No. 62/643,997 filed 16 Mar. 2018, the contents of which are herein incorporated by reference.

BACKGROUND OF THE INVENTION

The present invention relates to data communication and, more particularly, to a system and method for managing notifications, notification subscriptions and subscriber responses while maintaining subscriber data privacy.

For a "Provider," such as a company, a healthcare organization, a hotel, a professional (e.g., a doctor, an accountant, a lawyer, a consultant), keeping track of Customers who have requested to be notified about a subject they are interested in, along with their preferred contact information, can be time-consuming and error-prone. A "Customer" might be a client, a patient, a guest, a traveler, or any other type of a consumer or a business that receives a service or some value from a Provider. The "List" of Customers who have requested to be notified, if maintained by hand, may become unwieldy and out of date. Customer contact information (such as mobile phone numbers or email addresses) may get recorded incorrectly, which can result in the wrong person being notified while an intended Customer misses a notification. This problem is compounded because the subjects of notifications may be numerous and vary on a daily basis. As an example, a notification can be sent out about a change in a Provider's schedule due to a cancellation of an existing appointment, or about the fact that the Provider is starting to accept new Customers. Furthermore, special regulations about the privacy of Customer data may apply in a number of industries and countries, requiring Providers to protect the privacy of their Customers' identities and customer data.

Likewise, for Customers it can be time-consuming and inconvenient to periodically contact their Provider to inquire about the status of the subject about which they would like to be notified (e.g., about last-minute cancellations, or whether the Provider is accepting new Customers). As a result, Providers may incur downtime or lose an opportunity to offer value and generate income, while Customers can miss an opportunity to receive value.

Thus, for both Provider and Customer, managing notifications and inquiries may be too tedious to do manually and too voluminous to maintain satisfactory accuracy through the current systems that use spreadsheets, word processing software, or paper records to manually maintain a List of Customers who want to be notified about changes in a Provider's status. As a result, once a change in the status of the Provider occurs, contacting one Customer on the List at a time, leaving a voicemail and waiting for their response, is also time-consuming and labor-intensive. Moreover, notified customers may not be able to respond in time, resulting in the Provider missing an opportunity to provide value and generate income. And so, Customers who have not been notified will not have an opportunity to take advantage of the change in the Provider's status, which may impact their ability to receive value from the Provider.

In other words, keeping track of a list of Customers who want to receive notifications and contacting them one by one to notify them when a need arises, is a manual effort fraught with obstacles. A list of Customers manually maintained by a Provider can get out of date, or contain inaccurate contact information (e.g., a Customer's phone number can be written incorrectly by the Provider's staff). Customers may receive notifications that they are no longer interested in. Customers have to contact the Provider to ask to be removed from the List in order to stop receiving notifications. Customers on a list may not receive notifications in time due to the limited number of contact methods available to the Provider to notify the Customers, who, for example, may not be able to answer the phone call from their Provider. Plus, Customers may not be able to respond to the Provider in time.

As can be seen, there is a need for a system and method for managing notifications, notification subscriptions and subscriber responses while maintaining subscriber data privacy that for Providers does the following: eliminates a need for the tedious process of manually keeping track of Customers who have requested to be notified about a subject in which they're interested; guarantees the accuracy of the Customer's contact info, while preserving their privacy, and complying with privacy laws and regulations about Customer data; streamlines and simplifies the time-consuming and labor intensive process of notifying Customers who have opted in to receive Provider notifications, while preserving flexibility for Providers to pick and choose which of the Customers to notify; and consolidates and aggregates Customer responses to notifications simplifying a process for selecting which Customer to engage with (as opposed to relying on Customers to call the Provider one by one to express their interest, which would require the Provider to manually track which of the Customers responded, etc.). The system of the present invention is also adapted to address these issues for Customers: eliminates a need for Customers to continue to periodically contact their Provider to inquire about the status on a subject they are interested in; enables Customers to choose how they get notified depending on the subject, making it more convenient and reliable; provides peace of mind to Customers that their request to receive notifications will be properly managed with minimized risk for a human error (as an example, their Provider forgetting to notify them, or using a wrong email or phone number for them); and simplifies sending responses to their Provider (as opposed to requiring them to contact their Provider, e.g., by phone or email to express their interest).

The present invention allows Customers to subscribe to receive different types of notifications offered by a Provider in a way that is most convenient for them, such as by email, mobile phone, voice call, or mobile app. Different "Channels" can be used for different types of notifications, or for different types of subject areas. For example: a Channel for notifications about changes in Provider's availability for follow up appointments with existing Customers; a Channel for notifications about changes in a Provider's availability for appointments with new (first-time) Customers; a Channel for notifications about new offers and promotions; a Channel for notifications about unplanned office closures or delays (for example, due to inclement weather or other emergency) and/or a Channel for notifications about new developments, tips, recommendations, or research studies. Therefore, Customers can choose which methods of contact to use for different Channels; for instance, they can select email for notifications about new offers and promotions and choose to receive notification via text messages and voice calls for changes in the Provider's availability or schedule. For each notification, a Provider can choose which of the subscribers to include in their notification.

With the system and methods of the present invention, a Customer can easily subscribe or unsubscribe to a Provider's Channel without having to contact or ask their Provider. Likewise, a Provider can easily notify Customers who have subscribed to receive notifications without having to manually maintain a List or manually contact those Customers, one by one. The determination of priority may be made by the Provider, and not necessarily by the system. In addition, Customers can include their comments and preferences when subscribing to a Provider's channel to help Providers understand their motivations or reason for subscribing.

Information about which Customers subscribe to which Channel and Customer's contact information are maintained privately in full compliance with HIPAA and other government or industry privacy or security rules and regulations. Other than the Provider, no one else can know who is subscribing to which Channel. A list of Customers to be notified is maintained automatically with no involvement required from the Provider. Customers can subscribe and unsubscribe to receive notifications as they see fit. The list is kept up to date by the Customers. Only Customers who choose to subscribe will be included. Customers can opt-out when they choose to. Providers do not have to contact each of the Customers who subscribed to receive notifications, individually, one by one. At their discretion, Providers can choose which of the subscribed Customers to include in their notifications. Customers do not have to periodically contact Providers to inquire about changes in the subject of their interest. Customers are automatically notified of changes.

The present invention embodies the following characteristics and behaviors: Customers can select how to be notified about the status of a subject they are interested in (like if there are any appointment cancellations, or if the Provider starts to accept new Customers) by subscribing to one or more of the Provider's Channels; a Provider can send out a Channel notification to all or a subset of subscribed Customers; Customers can respond to any of the received notifications expressing their interest in being contacted by the Provider; Providers can optionally choose which of the Customers who've responded to contact based on the factors that are most important to the Provider; Customers can unsubscribe from receiving notifications at any time, or adjust their methods of contact (such as remove or change their email addresses, remove their mobile phone number etc.); and the Provider, at their discretion, can at any time unsubscribe any Customer, thus preventing them from receiving future notifications.

The solutions embodied in the present invention meet an inherently computer and Internet-based problem of online notifications, as well as improve the technology of computer-to-computer transmission in the field of data transmissions and notifications.

SUMMARY OF THE INVENTION

In one aspect of the present invention, a method for using one or more configurable data privacy parameters (which may include Customer identifying information among other things) for providing notifications for a plurality of broadcast channels, the method includes the following: receiving, via one or more processors, one or more configurable data privacy parameters and a notification request associated with one or more broadcast channels, wherein the one or more configurable data privacy parameters (a) are input via an interactive user interface by a customer, the interactive user interface executing on a customer computing entity associated with the customer, (b) define contact information associated with the customer, and (c) identify the customer computing entity associated with the customer; storing, via the one or more processors, the one or more configurable data privacy parameters in association with an account for the customer; and responsive to receiving a request to subscribe to or unsubscribe from one or more broadcast channels of the plurality of broadcast channels: identifying, via the one or more processors and based at least in part on the notification request, the account for the customer, determining, via the one or more processors, a privacy compliance threshold for the notification request, wherein the privacy type originates from a provider computing entity associated with a provider, identifying, via the one or more processors, (a) the contact information associated with the customer computing entity based at least in part on the input generated by the customer computing entity, (b) a history of prior notification requests associated with the customer computing entity and (c) prior notification set to the customer computing entity by the provider computing entity, and determining, via the one or more processors and based at least in part on respective real-time data privacy regulations, whether the customer computing entity and the provider computing entity have met the privacy compliance threshold; and responsive to determining that the customer computing entity and the provider computing entity meet the privacy compliance threshold: automatically providing, via the one or more processors, a notification for the customer computing entity to display via the first interactive user interface, (a) the one or more notifications from the one or more broadcast channels and (b) an indication that the respective broadcast channel is subscribed to.

In another aspect of the present invention, the method for using one or more configurable data privacy parameters for providing notifications for a plurality of broadcast channels, the method further includes the following: wherein the provider computing entity tracks and analyzes dynamics related to requests to subscribe to or un-subscribe from one or more of the plurality of broadcast channels, wherein said dynamics include a subject matter, a time stamp, a duration, and/or a frequency of the respective requests to subscribe or unsubscribe, wherein customers simultaneously receive said notification for all of the respective requests to subscribe or unsubscribe, wherein all the customer contact information is protected during the transmission of said notifications so as to meet government and industry security and privacy regulations, wherein said requests to subscribe or unsubscribe do not require the customer to set up a user identification and password, wherein the customer computing entity is adapted to selectively determine a method of receiving and a frequency of receiving said notifications, wherein the provider computing entity is adapted to subscribe or unsubscribe one or more customers or types of customers using a set of custom criteria, wherein the provider computing entity is adapted to exclude a subset of customers from a specific notification, wherein a notification is related to an open a timeslot for an appointment or availability of a product or service when a respective service or a product becomes available, wherein the provider computing entity is adapted to select a subset of customers from a plurality of customers to set up said appointment.

These and other features, aspects and advantages of the present invention will become better understood with reference to the following drawings, description and claims.

DETAILED DESCRIPTION OF THE INVENTION

The following detailed description is one of the best currently contemplated modes of carrying out exemplary embodiments of the invention. The description is not to be taken in a limiting sense but is made merely for the purpose of illustrating the general principles of the present invention.

Broadly, an embodiment of the present invention provides a system and method for managing notifications, notification subscriptions and subscriber responses while maintaining subscriber data privacy.

The present invention may include at least one computer with a user interface. The computer may include at least one processing unit and a form of memory including, but not limited to, a desktop, laptop, and smart device, such as, a tablet and smart phone. The computer includes a program product including a machine-readable program code for causing, when executed, the computer to perform steps. The program product may include software which may either be loaded onto the computer or accessed by the computer. The loaded software may include an application on a smart device. The software may be accessed by the computer using a web browser. The computer may access the software via the web browser using the Internet, extranet, intranet, host server, Internet cloud and the like.

Figure 1:
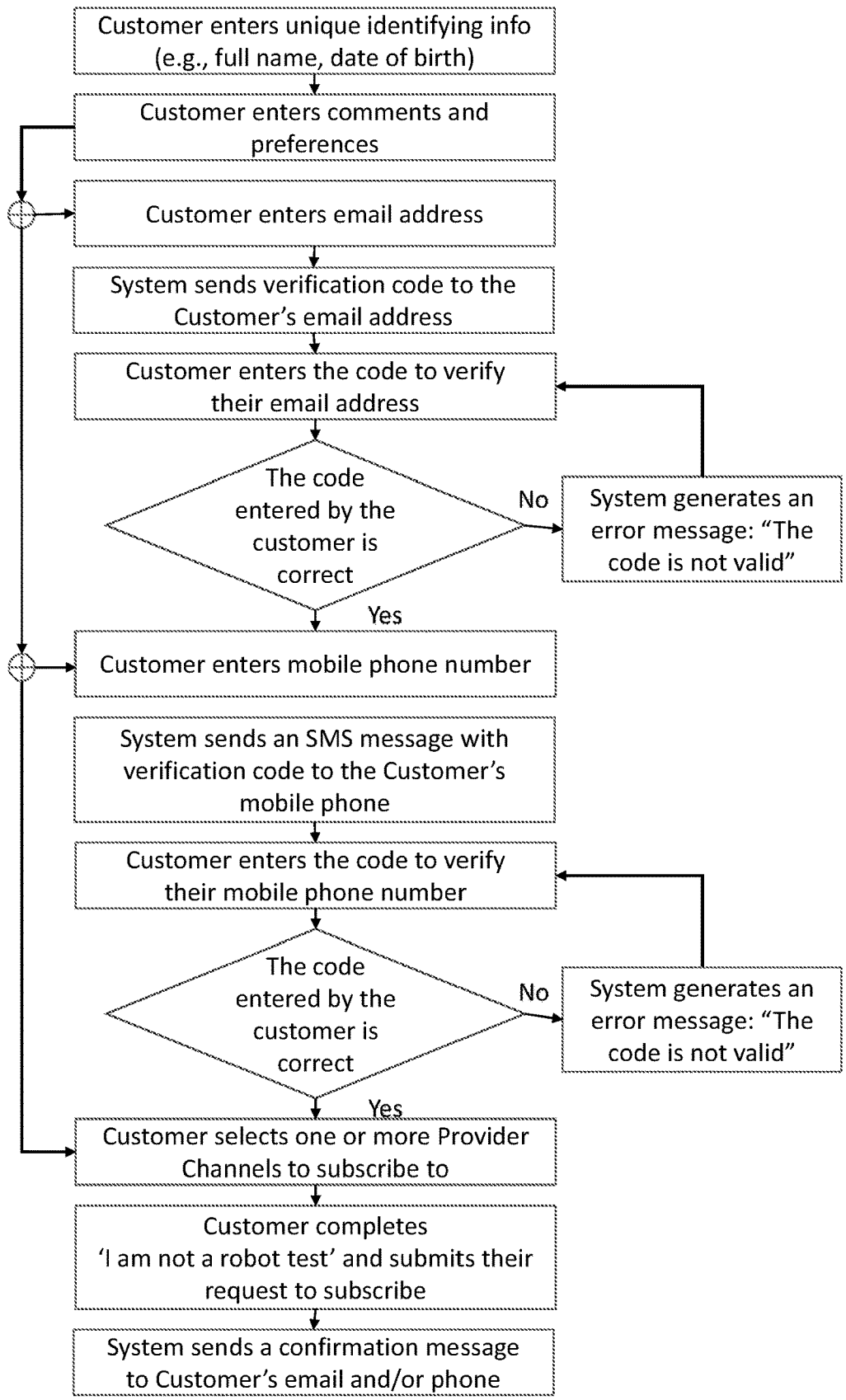
FIG. 1 is a flow chart of an exemplary embodiment of a customer subscription modality of the present invention.
Figure 2:
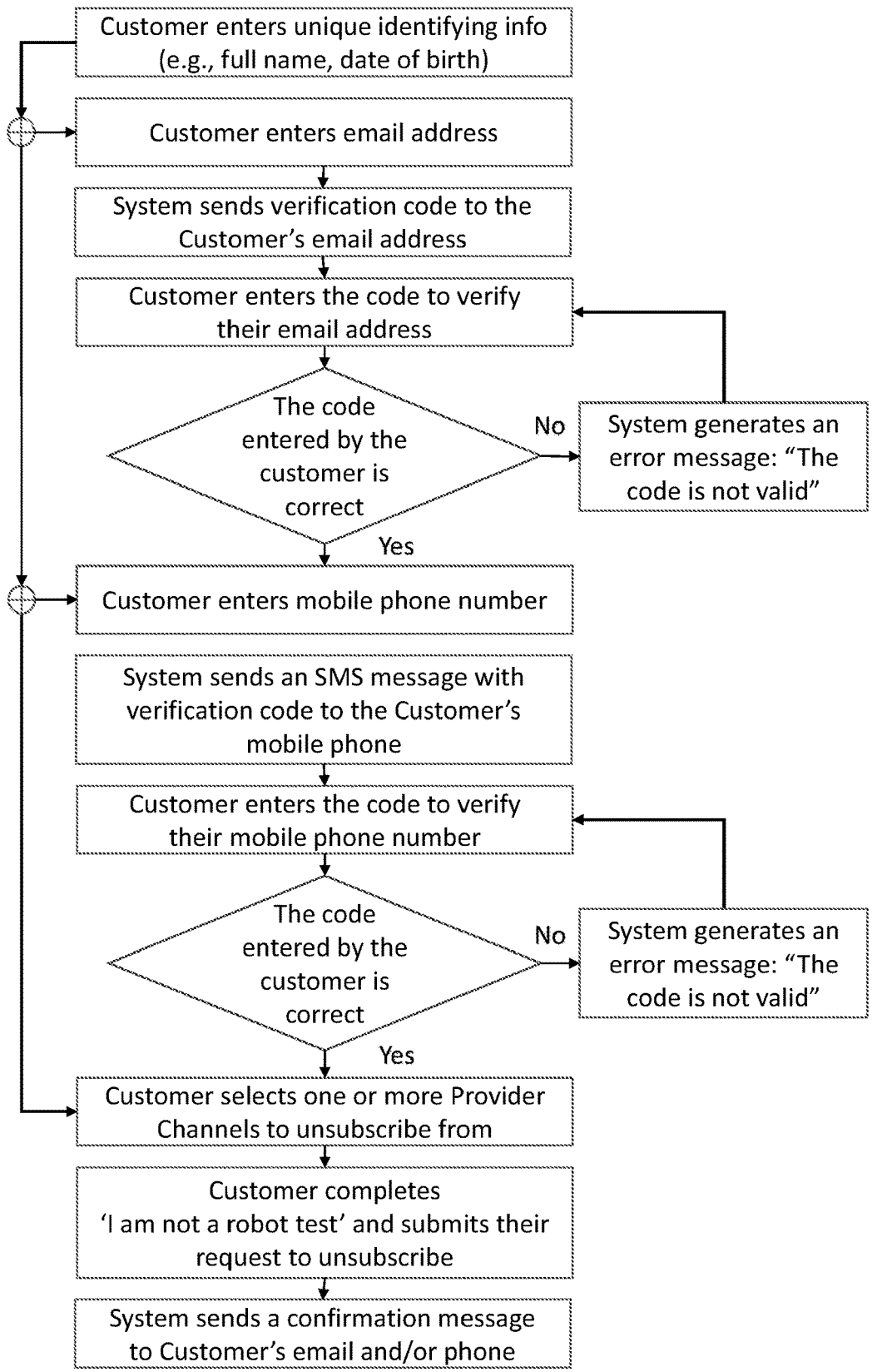
FIG. 2 is a flow chart of an exemplary embodiment of a customer un-subscription modality of the present invention.
Figure 3:
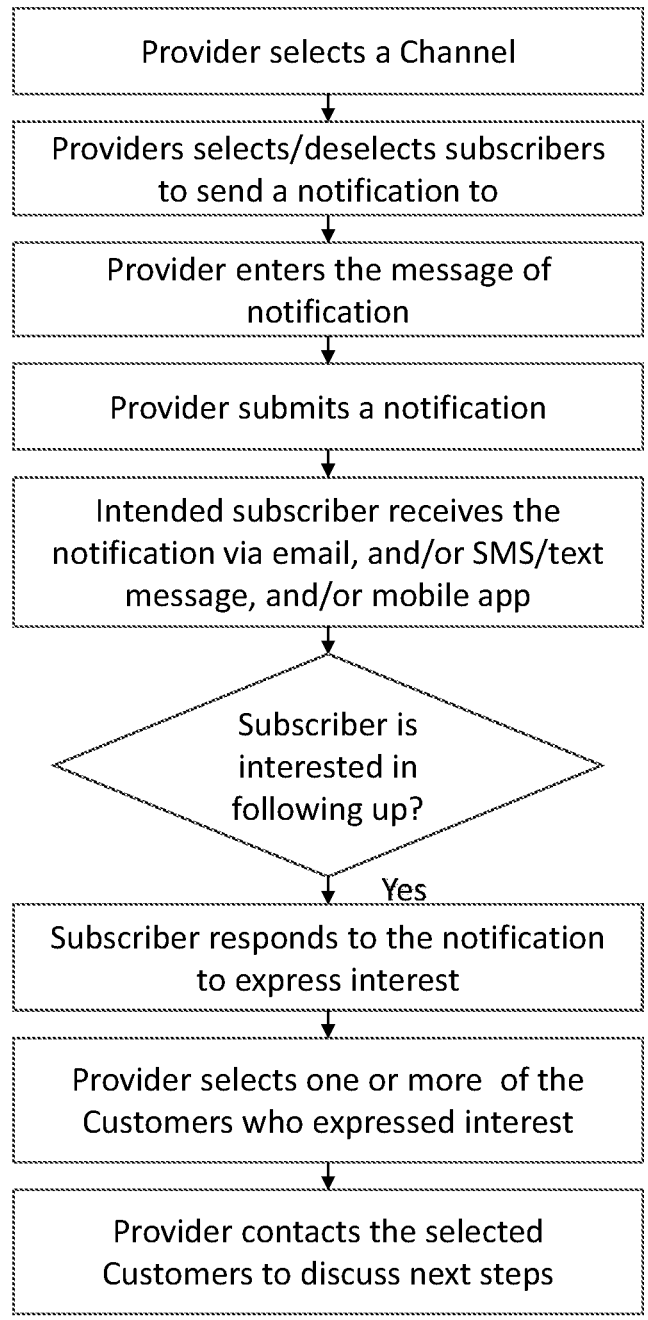
FIG. 3 is a flow chart of an exemplary embodiment of a provider broadcast notification modality of the present invention.

Referring now to FIGS. 1 through 3, the present invention may include the following components: Component 1. Customer sign-up form; Component 2. Customer unsubscribe form; Component 3. Phone verification capability; Component 4. Email verification capability; Component 5. Botnet protection capability; Component 6. Customer Identification Information; Component 7. Notification message; Component 8. Confirmation message to a Customer successfully subscribing to a Provider's Channel; Component 9. Confirmation message to a Customer successfully unsubscribing from a Provider's Channel; Component 10. A system-generated acknowledgement of a message received from a Customer; Component 11. A form for managing subscribers of a Provider's Channel; Component 12. A Provider's Channel for broadcasting notifications about a specific topic or subject area; Component 13. A Customer unsubscribe request; Component 14. A Customer subscribe request; Component 15. A Customer interest request; Component 16. Customer contact information (such as mobile phone, email address); Component 17. Customer comments and preferences with respect to the value (e.g., a service or product) desired from the Provider; Component 18. History of notifications sent out to the subscribed Customers; Component 19. Instructions about suggested next steps and possible options; Component 20. A Customer opt-out request; and Component 21. A Customer help request.

The aforementioned components may be embodied in the following process steps: Step 1. A Customer subscribes to a Provider's Channel to receive notifications; Step 2. A Customer unsubscribes from a Provider's Channel; Step 3. The system sends a confirmation about a Customer successfully subscribing or unsubscribing; Step 4. The Provider unsubscribes a Customer from their Channel; Step 5. The Provider sends a notification; Step 6. The Provider views and manages the list of subscribers; Step 7. Upon receiving a message from a Customer, the system responds with instructions about suggested next steps and possible options.

Referring to FIG. 1, in Step 1: Customer subscribes to a Provider's Channel to receive notifications; specifically, a Customer can subscribe on a Provider's website to the Provider's Channel (Component 12) using a Customer sign-up form (Component 1), generating a 'subscribe' request (Component 14)—by entering each of the following items:

Their unique Customer Identification Information (Component 6), such as their Full Name, Date of Birth.

Their contact information, such as their mobile phone number, email address (Component 16).

Their preferences or requirements with respect to the service or product desired from the Provider (Component 17).

The verification code is generated by the system and sent to the Customer using the provided contact info (Component 16—e.g., via SMS to the mobile phone or via email), to help validate their mobile phone number and/or their email address, leveraging Phone verification capability (Component 3), and Email verification capability (Component 4).

The input required to complete the "I'm not a robot" test (protection against botnet attacks) leveraging the botnet protection capability (Component 5).

After subscribing once and later unsubscribing, a Customer can re-subscribe to the Provider's Channel (Component 12) via SMS or email, by responding 'Subscribe' to a previously received system-generated message (Component 14), generating a 'subscribe' request (Component 14), along with their comments and preferences (Component 17).

A Customer can subscribe to the Provider's Channel (Component 12) generating a 'subscribe' request (Component 14) using a mobile device app, by Selecting a Provider Selecting one or more of the Provider's Channels Selecting Communication preferences (Component 16, e.g., by opting to receive notifications by SMS/text, email, and/or voice call).

Entering their comments or preferences (Component 17).

Upon receiving the subscription request from the Customer, the system will generate a confirmation message about the customer's successful subscription to the Provider's Channel (Component 8), along with Instructions about suggested next steps and possible options (Component 19).

In other words, to subscribe to a Provider's Channel, Customers must successfully verify their contact info (such as their email address or their mobile phone number for texting) and pass an "I'm not a robot" test. The invention logic verifies that all input information is correct before allowing a Customer to subscribe. When a Customer subscribes the first time for notifications, their mobile phone and/or email address are verified. The Customer may unsubscribe at any time. Unless the Customer has requested complete removal from the Provider Channels, if the Customer re-subscribes for notifications, re-verification of their phone number and/or email address is not necessary. This simplifies what is required of the Customer. Invention program logic determines whether a phone number or email address need be verified. If a Customer attempts to subscribe to receive notifications using a non-mobile phone number, such as a landline, a VOIP number, or an incomplete number, the invention logic will recognize this and require the Customer to try again with a valid mobile phone number.

Referring to FIG. 2, in Step 2: Customer unsubscribes from Provider's channel; specifically, a Customer can unsubscribe on a Provider's website from the Provider's Channel (Component 12) using a Customer Unsubscribe form (Component 2) generating an 'unsubscribe' request (Component 13), by Verifying their identity, by entering their contact information (mobile phone number, email address—Component 16)

Entering the verification code that was generated by the system and sent to the Customer using provided contact info, e.g., via SMS to the mobile phone (Component 3) or via email (Component 4) to validate the Customer's identity The input needed to complete the "I'm not a robot" test (protection against botnet attacks) (Component 5).

A Customer can unsubscribe from the Provider's Channel (Component 12) via SMS or email, by responding 'unsubscribe' to a system generated message—generating an 'unsubscribe' request (Component 13).

A Customer can unsubscribe from the Provider's Channel (Component 12) using a mobile device app, by selecting a Provider, a Channel and submitting an unsubscribe request (Component 13).

Upon receiving the request from the Customer to unsubscribe, the system will generate a confirmation message about the customer's successful subscription cancellation from the Provider's Channel (Component 9), along with Instructions about suggested next steps and possible options (Component 19).

Step 3. System sends a confirmation about the Customer successfully subscribing or unsubscribing Upon a customer subscribing to the Provider's Channel (Component 12) or unsubscribing from receiving notifications, the system sends a confirmation message (Component 8 for subscribing, or Component 9 for unsubscribing) using the communication preferences (Component 16) that were provided by the Customer at the time of subscribing (e.g., sending an SMS/text message to the Customer's mobile phone or their email).

The message can include

A statement of confirmation, such as

"This is the office of Provider XYZ. Thank you for subscribing to receive our notifications about {ABC}!" (Component 8)

or

"This is an office of Provider XYZ. Thank you for unsubscribing. You will no longer receive notifications about changes about {ABC}." (Component 9).

Information about possible options and next steps (Component 19), such as

"You can reply 'Stop' or 'Unsubscribe' at any time to stop receiving further notifications."

"You can reply 'Resume' or 'Subscribe' at any time to re-subscribe to start receiving notifications about {ABC}."

Step 4. Provider unsubscribes a Customer from their Channel (Component 12)

A Provider at their discretion can unsubscribe any of the Customers previously subscribed to receive notifications, using Component 11 (Form for managing subscribers of Provider's Channel). The Customers may not receive a system message confirming the un-subscription. Methods for Customer auto-unsubscribing from a Provider's Channel may vary, for an example, Customers may subscribe for a limited period of time, such as only for one day or one week, after which they are automatically unsubscribed without being required to submit an unsubscribe request.

Referring to FIG. 3, in Step 5: Provider sends a notification (Component 7)

A Provider can send out and distribute a notification (Component 7) to each or some of the Customers subscribed to one of the Provider's Channels (Component 12). The Provider can select which of the Customers to include in the distribution list when broadcasting notifications.

A Provider at their discretion can exclude some of the subscribed Customers from receiving a notification (Component 7).

The notification message (Component 7) can include instructions, and information about possible options and next steps (Component 19):

As an example, "This is an office of Provider XYZ. This is to inform you that we now have the following time slot available: Monday, January 15th at 3:30 pm. If you are interested in scheduling an appointment at that time, please respond 'Yes' or 'Interested' or contact our office at your earliest convenience."

Step 6. Provider can view and manage the list of subscribers (Component 12) and history of notifications (Component 18) using a form for managing subscribers of the Provider's Channel (Component 11)

The Provider can view the details about

Which Customer subscribed (subscribe requests—Component 14) or unsubscribed (unsubscribe requests—Component 13) from which Channel (Component 12), when (date and time stamp) and how (what method was used by the Customer, by website, mobile app or by responding via SMS/text or email to a previously generated system message).

Customer comments and preferences (Component 17).

Communication of preferences Customers have selected to receive notifications when subscribing (Component 16).

Which, when and how Customers were notified (e.g., by email, via text-message).

Which and when Customers were unsubscribed by the staff of the Provider.

Previously sent-out notifications (Component 7) showing what content was included, the list of recipients, their contact info used (Component 16), the date and time stamp.

Step 7. Upon receiving a message from a Customer, the system responds with an acknowledgement (Component 10) and instructions about suggested next steps and possible options (Component 19).

Upon receiving a reply from a Customer, the system automatically generates and sends a message back to the Customer that is a conditional subset of the following:

If a Customer expresses interest by replying 'Yes' to a notification (Component 15), the system will respond with an acknowledgement (Component 10), e.g., "Thank you for your interest" and with instructions (Component 19) such as "Please contact our office to discuss the next steps"

If a Customer replies 'subscribe' to any system generated message (Component 14), the system automatically sends an acknowledgement (Component 10) with Component 8 (Confirmation message about Customer's successful subscription to the Provider's Channel), and with a message of instructions about suggested next steps and possible options (Component 19).

If a Customer replies 'unsubscribe' to any of the system generated messages (Component 13), the system automatically sends a message to acknowledge their request (Component 10), along with a confirmation of the successful un-subscription from the Provider's Channel (Component 9), and a message with instructions about suggested next steps and possible options (Component 19).

If a Customer replies 'remove' or 'opt out' to any system generated message (Component 20), the system automatically sends a message acknowledging their request (Component 10), confirming that the Customer Identification Information (Component 6) and their contact information (Component 16), their email address or phone number, have been deleted from all of the Provider's Channels (Component 12), along with Instructions about suggested next steps and possible options (Component 19).

If a Customer replies with 'help' to any system generated message (Component 21), the system automatically sends a message with Instructions about possible options (Component 19).

If a Customer replies with a message unsupported by the system, the system automatically sends an acknowledgment of their request (Component 10), with Instructions about possible options (Component 19).

A method of making the present invention may include the following: Creating online forms for Customers to subscribe to and unsubscribe from a Provider's Channels. Developing mobile device and/or desktop apps for Customers to subscribe to and unsubscribe from a Provider's Channels. Developing an algorithm and software to verify Customer contact methods (email addresses and phone numbers). Developing logic to handle newly subscribing Customers, existing Customers re-subscribing, Customers unsubscribing, and Customers requesting complete removal from the Provider's Channels, including duplicate avoidance. (A Customer can be subscribed to a Provider's Channel with multiple contact methods but only once with the same contact method, e.g., with the same mobile phone number.) Incorporating botnet protection. Developing a capability for Providers to view and manage lists of subscribers. Developing a capability for Providers to select/deselect recipients and distribute (broadcast) notifications. Developing a capability for Providers to view the history of the notifications. Developing a capability for Providers to "clean up" their lists of subscribers, e.g., to remove obsolete Customer entries based on validity and age of the Customer information.

In sum, the following elements are necessary:
1. A list of Customers who want to receive notifications (A list of subscribers per each Provider Channel).
2. Customer Identifying Information that is used to uniquely differentiate Customers from each other.
3. A Customer method of contact for notification (how they can be notified, for example via email, via SMS/Text message, via voice-call, voicemail, etc.).
4. A subscription method with which Customers can subscribe to a Provider's Channel.
5. An un-subscription method (how Customers can unsubscribe from a Provider's Channel)
6. A method for Providers to choose which of the Customers to include in a notification
7. A method for broadcasting notifications to the current subscribers of a Provider's Channel.
8. Notifications for Subscribers
9. Notifications for Providers (e.g., about Customer subscribe requests, unsubscribe requests, about Customer interest about received notification or offer).
10. A method for authenticating a Customer's identity.
11. A method for verifying and validating a Customer's methods of contact (e.g., the Customer's phone numbers, email addresses, etc.).
12. A method for addressing privacy and security requirements for maintaining and storing Customer information, their contact information, history of their subscribe/unsubscribe requests and received notifications (e.g., to address industry or government regulatory or compliance requirements).
13. A method for interpreting and validating customer requests (e.g., the content of SMS messages or emails received from Customers in response to distributed notifications, that the Customer really is a customer, etc.).
14. A method for responding to Customer requests (e.g., with instructions regarding the next steps or possible options).

These above-mentioned necessary elements work individually and together to cause the present invention to perform its desired function through the following steps. A Customer enters their Customer Identification Information, such as their Full Name, Date of Birth, (Component 6) on the Customer sign-up form (Component 1). The Customer enters their contact information, such as their mobile phone number, email address, (Component 16) on the Customer sign-up form. The Customer enters their comments, reasons or preferences (Component 17). The system sends a verification code to the Customer's mobile phone and/or email address (Components 3 & 4). The Customer enters the received verification code on the Customer sign-up form (Components 3 & 4). The Customer enters the input to complete the "I'm not a robot" test (Component 5), required when filling out the form through a website. The Customer responds 'stop' to a message received from the system to unsubscribe from the Provider's Channel (Component 13). The Customer responds 're-subscribe" to a message received from the system to re-subscribe to the Provider's Channel (Component 14). The Provider sends a notification about a change relevant for their Channel subscribers (Component 7). The Customer receives the notification (Component 7). The Customer responds 'yes' to express their interest in being contacted by the Provider (Component 15).

With that said, some element and components can be shuffled, interchanged, or reconfigured to cause the invention to perform an identical or similar function; for example: Providers may incorporate an approval process or method to review and accept Customer requests to subscribe to one of their Channels (as opposed to allowing Customers to be subscribed automatically); Subscribed Customers can be grouped in different categories and managed separately based on their category; The same Channel can be maintained and managed for multiple Providers, so customers can subscribe to receive notifications from pre-selected Providers only or from any of the Providers. This could be appropriate when there are multiple Providers in a single office; Customer notifications can be sent out to each of the provided contact mechanisms (e.g., email & SMS/text) at the same time, or in a specific order (e.g., first a notification is sent via email, and then after some time via SMS/text message); Customer contact preferences can include a variety of different mechanisms (e.g., email, voice-calls, voice-mails, SMS/text message, instant message, etc.). A number of different methods of contact can be limited at the discretion of the Provider (e.g., how many email addresses or phone numbers can be allowed per each Customer); Customers can subscribe to receive or unsubscribe from receiving notifications using various devices and mechanisms, e.g., through websites, desktop apps, mobile device apps, Internet-of-things devices, etc.; Customer comments or preferences can be described with one or more parameters or attributes, such as urgency, specific days/weeks, or times of days, etc. The Customer parameters or preferences can be taken into account to exclude certain customers from receiving notifications depending on the context; Providers may use a set of parameters or attributes to differentiate Customers (e.g., based on the type of the product or service desired, or based on the Customer type). These parameters and preferences can be used to exclude certain Customers from receiving notifications at the discretion of the Provider, or to prioritize the order of notifications); Providers may impose a limit on how many Customers can subscribe to their Channel, for how long a Customer can subscribe to a Channel, or for how many Channels a Customer can subscribe to at the same time; Notifications can be sent out in a predetermined order (e.g., based on a Customer type and/or other factors), as opposed to all Customers being notified at the same time; Different verification and validation methods and processes can be employed to authenticate Customers or to verify their methods of contact (e.g., their phone numbers or their email addresses), e.g., when subscribing or unsubscribing; A Provider may publish their notifications on a public forum, e.g., on their website (thus not requiring Customers to be subscribed to be able to see notifications); Provider may opt to auction their offers, to allow their Customers to compete against each other; and/or Customers may opt to auction their interest to purchase a service or product to allow Providers to compete against each other.

A method of using the present invention may include the following: The system disclosed above may be provided. One or more Providers would setup Channels for different types of notifications. E.g., a Channel for notifications about last minute cancellations, a Channel for notifications about offers and promotions, a Channel for notifications about new research, developments, tips and recommendations. Customers would subscribe to one or more of the available Channels. The Provider would send notifications to subscribers of a specific Channel to communicate about relevant changes, updates or information. As a result, Providers would send notifications to subscribers of a Channel without being required to make time-consuming and labor-intensive efforts to manually create and manage a list of subscribers, or to contact and engage with each of the interested Customers manually, one at a time. Customers would use this method and the system to receive notifications, without requiring time-consuming efforts to periodically contact their Provider repeatedly to inquire about status or the subject in which they are interested.

The invention can be implemented as a service or as a software product (e.g., desktop software or a mobile device app) through a website for use with an Internet browser, with mobile device apps or desktop apps. A Provider could potentially leverage artificial intelligence capabilities to automatically generate notifications or conduct research to analyze trends about rates of Customer subscriptions, or Customer responses to different types of notifications. The invention cannot be implemented with only a mechanical device. Software and a computing platform are required.

The computer-based data processing system and method described above is for purposes of example only and may be implemented in any type of computer system or programming or processing environment, or in a computer program, alone or in conjunction with hardware. The present invention may also be implemented in software stored on a computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the invention is not limited to any specific computer language, program, or computer. It is further contemplated that the present invention may be run on a stand-alone computer system or may be run from a server computer system that can be accessed by a plurality of client computer systems interconnected over an intranet network, or that is accessible to clients over the Internet. In addition, many embodiments of the present invention have application to a wide range of industries. To the extent the present application discloses a system, the method implemented by that system, as well as software stored on a computer-readable medium and executed as a computer program to perform the method on a general purpose or special purpose computer, are within the scope of the present invention. Further, to the extent the present application discloses a method, a system of apparatuses configured to implement the method are within the scope of the present invention.

It should be understood, of course, that the foregoing relates to exemplary embodiments of the invention and that modifications may be made without departing from the spirit and scope of the invention as set forth in the following claims.

What is claimed is:

1. A method for using one or more configurable data privacy parameters for providing notifications for a plurality of broadcast channels, the method comprising:

receiving, via one or more processors, one or more configurable data privacy parameters and a notification request associated with one or more broadcast channels, wherein the one or more configurable data privacy parameters (a) are input via an interactive user interface by a customer, the interactive user interface executing on a customer computing entity associated with the customer, (b) define contact information associated with the customer, and (c) identify the customer computing entity associated with the customer;

storing, via the one or more processors, the one or more configurable data privacy parameters in association with an account for the customer; and responsive to receiving a request to subscribe to or unsubscribe from one or more broadcast channel of the plurality of broadcast channels: identifying, via the one or more processors and based at least in part on the notification request, the account for the customer, determining, via the one or more processors, a privacy compliance threshold for the notification request, wherein the privacy compliance threshold originates from a provider computing entity associated with a provider, identifying, via the one or more processors, (a) the contact information associated with the customer computing entity based at least in part on the input generated by the customer computing entity, (b) a history of prior notification requests associated with the customer computing entity and (c) prior notification set to the customer computing entity by the provider computing entity, and determining, via the one or more processors and based at least in part on respective real-time data privacy regulations, whether the customer computing entity and the provider computing entity have met the privacy compliance threshold; and responsive to determining that the customer computing entity and the provider computing entity meet the privacy compliance threshold: automatically providing, via the one or more processors, a notification for the customer computing entity to display via the interactive user interface, (a) one or more notifications from the one or more broadcast channels and (b) an indication that the respective broadcast channel is subscribed to.

2. The method of claim 1, wherein the provider computing entity tracks and analyzes dynamics related to requests to subscribe to or unsubscribe from one or more of the plurality of broadcast channels, wherein said dynamics include a subject matter, an time stamp, a duration, and/or a frequency of the respective requests to subscribe or unsubscribe.

3. The method of claim 1, wherein customers simultaneously receive said notification for all of the respective requests to subscribe or unsubscribe.

4. The method of claim 1, wherein said requests to subscribe or unsubscribe do not require the customer to set up a user identification and password.

5. The method of claim 1, wherein the customer computing entity is configured to selectively determine a method of receiving and a frequency of receiving said notifications.

6. The method of claim 1, wherein the provider computing entity is configured to subscribe or unsubscribe one or more customers or types of customers using a set of custom criteria.

7. The method of claim 1, wherein the provider computing entity is configured to exclude a subset of customers from a selected notification.

8. The method of claim 1, wherein a notification is related to an open a timeslot for an appointment when a respective service or a product becomes available.

9. The method of claim 8, wherein the provider computing entity is configured to select a subset of customers from a plurality of customers to set up said appointment.

\* \* \* \* \*